(12) United States Patent
Lai et al.

(10) Patent No.: US 7,558,601 B2
(45) Date of Patent: Jul. 7, 2009

(54) METHOD OF SWITCHING COMMUNICATION MODES OF A COMMUNICATION DEVICE

(75) Inventors: Cheng-Shing Lai, Taipei (TW); Ping Gu, Nangking (CN); Peng-Hui Liu, Nangking (CN)

(73) Assignee: Inventec Appliance Corporation, Taipei (TW)

( * ) Notice: Subject to any disclaimer, the term of this patent is extended or adjusted under 35 U.S.C. 154(b) by 777 days.

(21) Appl. No.: 11/167,084

(22) Filed: Jun. 28, 2005

(65) Prior Publication Data

US 2006/0128432 A1 Jun. 15, 2006

(30) Foreign Application Priority Data

Dec. 14, 2004 (TW) ............... 93138701 A

(51) Int. Cl.
*H04B 1/38* (2006.01)

(52) U.S. Cl. ............... 455/558; 455/552.1; 455/556.2; 455/557; 455/41.2

(58) Field of Classification Search ............... 455/558, 455/41.2, 412.1, 550.1, 552.1, 552.3, 556.1, 455/556.2, 557, 569.2; 365/230.01, 230.02
See application file for complete search history.

(56) References Cited

U.S. PATENT DOCUMENTS

| 6,078,825 | A | * | 6/2000 | Hahn et al. | ............... | 455/569.2 |
|---|---|---|---|---|---|---|
| 6,580,921 | B1 | * | 6/2003 | Inoue et al. | ............... | 455/552.1 |
| 6,724,680 | B1 | * | 4/2004 | Ng et al. | ................. | 365/230.03 |
| 7,433,712 | B2 | * | 10/2008 | Moran et al. | ................. | 455/557 |
| 2004/0116155 | A1 | * | 6/2004 | Aisenberg | ................... | 455/558 |
| 2004/0266480 | A1 | * | 12/2004 | Hjelt et al. | ................... | 455/558 |

* cited by examiner

*Primary Examiner*—Matthew D Anderson
*Assistant Examiner*—Shaima Q Aminzay
(74) *Attorney, Agent, or Firm*—Bacon & Thomas, PLLC

(57) ABSTRACT

The present invention is to provide a method of switching communication modules of a communication device, wherein said communication device comprises a control module and a built-in communication module and has a connecting port on a surface thereof, and the control module respectively connects to the connecting port and the built-in communication module. When the connecting port connects to an external communication module, the control module is able to activate both the external communication module and the built-in communication module, or alternatively one of the external communication module or the built-in communication module.

6 Claims, 3 Drawing Sheets

METHOD OF SWITCHING COMMUNICATION MODES OF A COMMUNICATION DEVICE

FIELD OF THE INVENTION

This invention relates generally to a method of switching communication modules, more specifically to a communication device comprising a control module and a built-in communication module and a connecting port on a surface thereof, when the connecting port connects to an external communication module, enabling the control module to activate both the external communication module and the built-in communication module, or alternatively one of the external communication module or the built-in communication module.

BACKGROUND OF THE INVENTION

As the present electronic industry is developed rapidly, high-tech electronic products such as computer and communication products are introduced to the market constantly. In recent years, hand-held electronic communication products become a main development and all manufacturers try to improve their products by providing various lightweight, thin, short and compact designs and adopting multiple functions and powerful software applications to meet the consumer's increasing demand and lead the industry. Among all hand-held products, mobile phones, personal digital assistants (PDA) and Personal Handy-phone System (PHS) mobile phones are three most important products, since these products have multiple application tools (software), and each of the tools has many accessory tools (bundled software) with different functions. PDA is very popular and extensively accepted by people all over the world. As to electronic manufacturers, the way of designing a produce with a multiple of functions or a unique function at the lowest possible cost to meet the consumer requirements becomes an important index for evaluating the technological level of electronic manufacturers.

After the General Packet Radio Service (GPRS) is established, independent Global System for Mobile Communication (GSM) and Internet are integrated. The GPRS technology adds several data exchange nodes to the current existing global mobile communication system. Since the data exchange node has the capability of processing packets, the GSM can link with Internet.

Further, the transmission speed between a GPRS mobile phone and a base station can reach up to 160 Kbps, and the GSM phone can only have a speed of 9.6 Kpbs for transmitting data. The transmission speed of GPRS phones is 16~17 times faster than that of GSM phones, and the speed of 160 Kbps is also 2 to 3 times faster than the 56 Kbps dial-up module. Thus, the transmission speed is improved greatly, and general computers can use the transmission speed of 56 Kbps to browse texts and graphics on the Internet. Of course, the GPRS phone also can send multimedia information including voices, graphics and texts.

As to the PHS phone, the Digital Cordless standard established by Japan is used; the transmission power of the base stations for mobile phones is usually below 32 W; the frequency ranges from 1895 MHz to 1918 MHz; and the PHS phone can dial or receive a call properly with a moving speed under 120 Km per hour. Compared with the high power mobile phones including the GSM900 and the DCS1800, the telephone fee of the PHS phone is much lower (about ⅓ of that of the GSM phone). Furthermore, the PHS phone has a low power consumption feature, no electromagnetic issue, a data transmission rate of 64 Kbps for broadband Internet access, an 800-hour idle time, and a capability of being plugged into an indoor phone line jack so as to have the function of a regular indoor phone. The PHS phone can be used at home, in the office and in the public area. The Japanese dual-mode technology allows users to maintain their original GSM phone number, while connecting their PHS phone to Internet for sending and receiving E-mails. One of the PHS service companies in Taiwan offers a "PHS Thumb Mail Service" that allows users to use a PHS phone to send and receive E-mails with an effect almost as convenient as a personal computer.

Since a general mobile phone only comes with one telecommunication service system, therefore users can only communicate with another mobile phone by one telecommunication service, and all other service systems are set aside and useless. Many mobile phone manufacturers and mobile phone accessory manufacturers developed a dual-mode mobile phone that can support both GSM and PHS. The dual-mode mobile phone can be switched freely between the GSM and PHS modules according to the environment and actual operation needs.

Although the dual-mode mobile phone has both GSM and PHS systems and is very convenient to users, users usually do not need to use both systems at the same time. Users use one of the systems at a certain time and a certain district. Furthermore, the cost of the dual-mode mobile phone is very high, and users usually will consider whether or not they really need such an expensive dual-mode mobile phone. The dual-mode mobile phone installs two different system chips and related components on a circuit board of the mobile phone, and the two system chips and related components occupy much space of the circuit board, so that the physical size of the circuit board cannot be reduced, and the lightweight, thin, short and compact design cannot be achieved, and the manufacturing cost cannot be lowered.

SUMMARY OF THE INVENTION

In view of the foregoing shortcomings of the prior arts, the inventor of the present invention conducted extensive researches and experiments and finally developed a method of switching communication modes of a communication device in accordance with the present invention to solve the aforementioned problems.

It is therefore a primary object of the invention to provide a method of switching communication modes of a communication device, and the communication device has a connecting port at its surface, and the communication device further comprises a control module and a built-in communication module; the control module connects to the connecting port and the built-in communication module; the external communication module and built-in communication module are matched with different communication systems respectively, such that when said communication device determines, through said control module, that said connecting port is connected to said external communication module, said control module carries out a procedures comprising the steps of using said user operating module to display a user interface on a display unit of said communication device; receiving an activation signal generated and transmitted by said user operating module through said user interface after said user interface begins to be in operation; and activating both said external module and said built-in communication module, or either one of said external module and said built-in communication module, based on said activation signal.

The accomplishment of the above-mentioned object of the present invention will become apparent from the following description and its accompanying drawings which disclose illustrative an embodiment of the present invention, and are as follows:

DETAILED DESCRIPTION OF THE PREFERRED EMBODIMENTS

Figure 1:
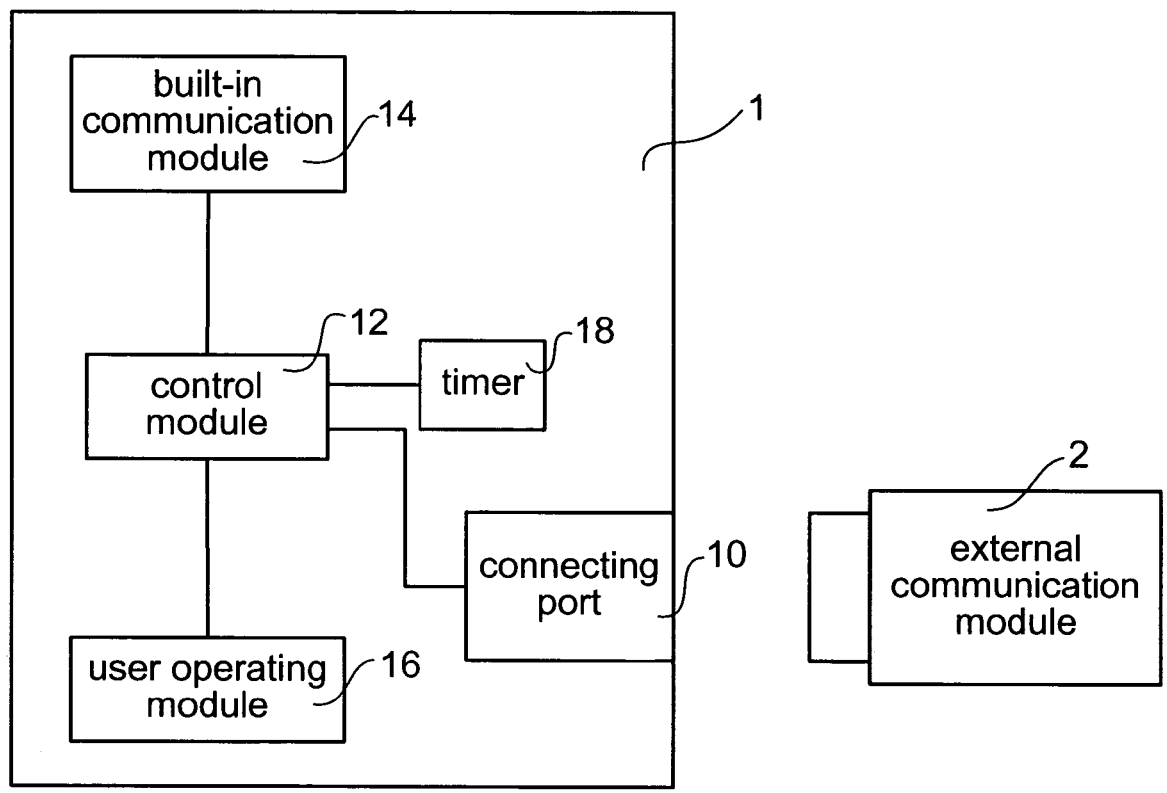
FIG. 1 is a block diagram of the present invention.

The dual-mode mobile phones in the market build both PHS and GSM modules in a mobile phone, however, the two modules are independent to each other; the present invention provides a method of switching communication modes. Referring to FIG. 1, a communication device 1 has a connecting port 10, at its surface; a connecting port 10 connects to an external communication module 2; the communication device 1 further comprises a control module 12 and a built-in communication module 14; the control module 12 connects to the connecting port 10 and the built-in communication module 14; the external communication module 2 and built-in communication module 14 are matched with different communication systems respectively, such that the communication device 1 uses the control module 12 to determine the connection status between the connecting port 10 and an external communication module, and the control module 12 bases on the connection status to simultaneously activate both external communication module 2 and the built-in communication module 14 or just activate one of them.

Figure 2:
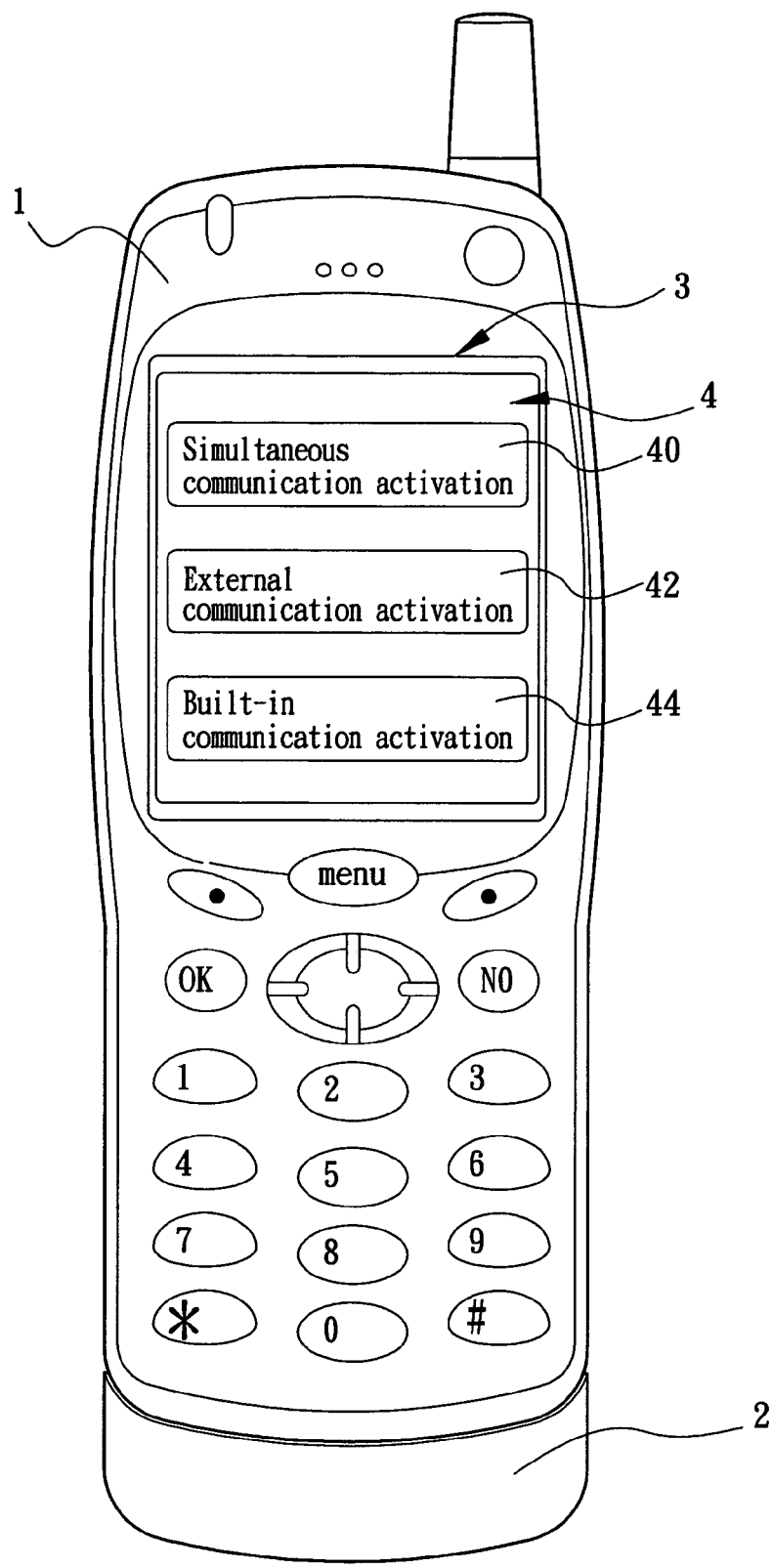
FIG. 2 is a schematic view of a user interface of the present invention.

Referring to FIGS. 1 and 2 for a preferred embodiment of the present invention, the communication device 1 further comprises a user operating module 16, and the user operating module 16 connects to the control module 12; the communication device 1 confirms the connection of the connecting port 10 with the external communication module 2 through the control module 12; the control module 12 uses the user operating module 16 to display the user interface 4 on a display unit 3 of the communication device 1; after the user interface 4 is operated, the user operating module 16 generates an activation signal, the activation signal is transmitted to the control module 12 through the user interface 4. The control module 12 activates the external module 2 and the built-in communication module 14 based on activation signal to activate either both external module 2 and the built-in communication module 14 or one of them. Thus users can select their desired communication mode flexibly.

Figure 3:
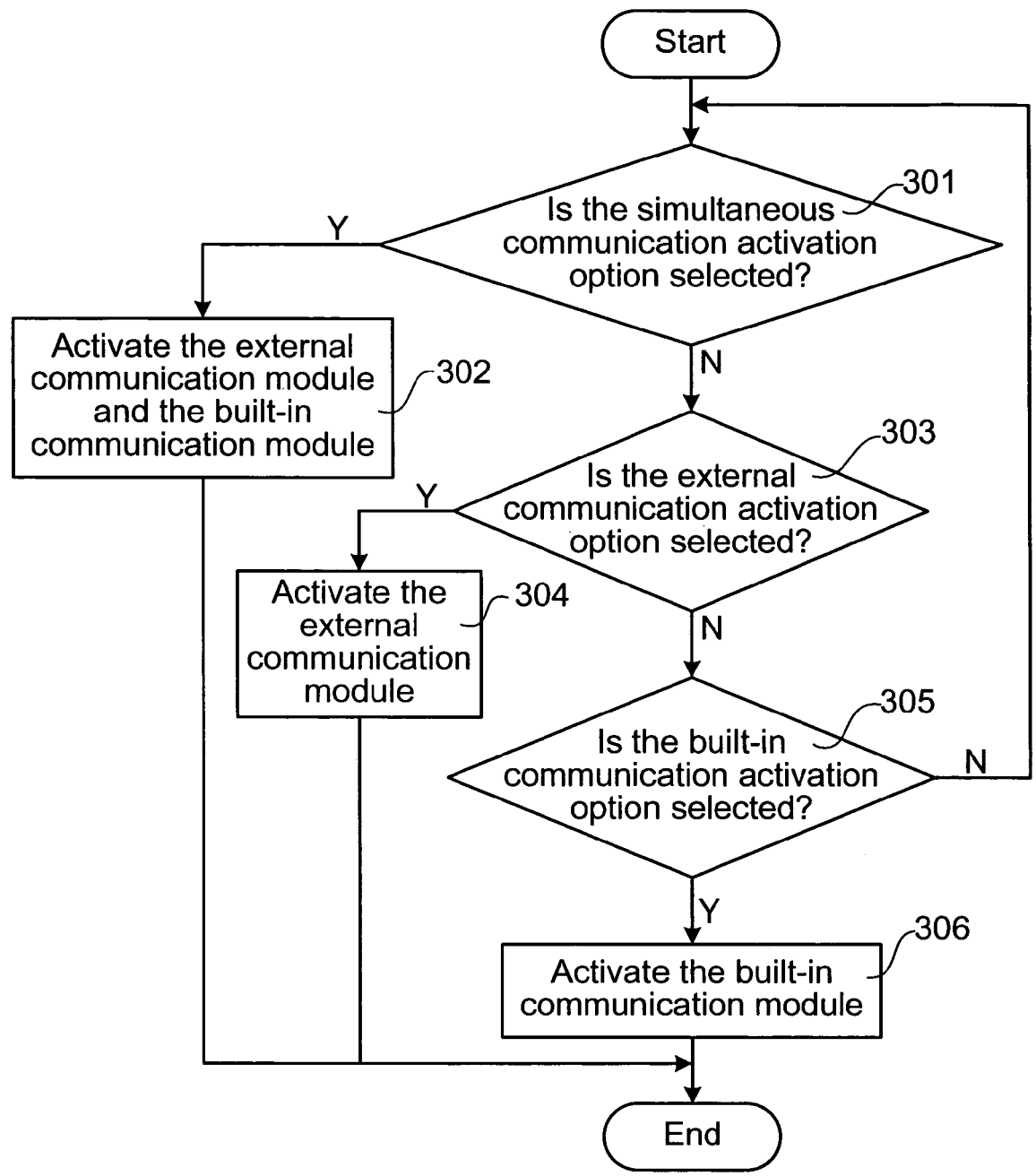
FIG. 3 is a flow chart of switching communication modes of the present invention.

Referring to FIGS. 2 and 3 for a preferred embodiment of the present invention, the user interface 4 has a simultaneous activation option 40, an external communication activation option 42 and a built-in communication activation option 44, and the control module 12 switches the communication modes according to following procedure:

Step 301: determines whether or not the simultaneous activation option 40 is selected; if yes, go to Step 302, or else go to Step 303;

Step 302: the user operating module 16 generates a match signal while activating the simultaneous activation option 40, and the control module 12 bases on a simultaneous activation signal to activate both external module 2 and built-in communication module 14;

Step 303: determines whether or not the external communication activation option 42 is selected, if yes, go to Step 304, or else go to Step 305;

Step 304: the user operating module 16 generates a match signal while activating the external communication activation option 42, and the control module 12 bases on an external activation signal to activate the external module 2;

Step 305: determines whether or not the built-in communication activation option 44 is selected; if yes, go to Step 306, or else go to Step 301;

Step 306: the user operating module 16 generates a match signal while activating the built-in communication activation option 44, and the control module 12 employs a built-in activation communication signal to activate the built-in communication module 14.

In this preferred embodiment, a timer 18 is built in the communication device 1, and the timer 18 can set a first wait time. The control module 12 reads the first wait time by reading the timer 18; and the control module 12 will wait when the first wait time has elapsed and the connecting port 10 hasn't been connected to the external communication module 2, then the control module 12 will activate the built-in communication module 14 automatically. The timer 18 can set two wait times, and the control module 12 reads a second wait time from the timer 18. The control module 12 will activates the built-in communication module 14 when the second wait time has elapsed and the activation signal hasn't been received.

Based on above description, the communication device 1 allows users to selectively activate both external module 2 and the built-in communication module 14, or activate either one of them. After the communication device 1 is not connected to the external module 2 or any communication module 14, 2 for a predetermined time, the communication device 1 will activate the built-in communication module 14 directly. Users can choose either the external module 2 or the built-in communication module 14 flexibly based on actual needs. The communication device 1 only has a built-in communication module 14, so that the physical size of the communication device 1 will not be too bulky, which can solve the size problem of the traditional dual-mode mobile phones.

While a preferred embodiment of the invention has been shown and described in detail, it will be readily understood and appreciated that numerous omissions, changes and additions may be made without departing from the spirit and scope of the invention.

What is claimed is:

1. A method of switching communication modes of a communication device having a connecting port on a surface thereof for connecting to an external communication module and comprising a control module, a built-in communication module, and a user operating module, wherein said control module is connected respectively to said connecting port, said built-in communication module, and said user operating module, said external communication module and said built-in communication module are matched with different respective communication systems and, when said communication device determines, through said control module, that said connecting port is connected to said external communication module, said control module carries out a procedure comprising the steps of:

using said user operating module to display a user interface on a display unit of said communication device, wherein said user interface includes a simultaneous activation option, an external communication activation option and a built-in communication activation option;

receiving an activation signal generated and transmitted by said user operating module through said user interface after said user interface begins to be in operation;

determining whether or not said simultaneous activation option, said external communication activation option or said built-in communication activation option is selected according to said activation signal; and activating both said external module and said built-in communication module, or either one of said external module and said built-in communication module, depending on said activation signal.

2. The method of switching communication modes of a communication device as recited in claim 1, wherein, when said simultaneous activation option is selected, said user operating module generates a simultaneous activation signal corresponding to said simultaneous activation option, and said control module activates said external module and said built-in communication module based on said simultaneous activation signal.

3. The method of switching communication modes of a communication device as recited in claim 1, wherein, when said external communication activation option is selected, said user operating module generates an external communication activation signal corresponding to said external communication activation option, and said control module activates said external module based on said external communication activation signal.

4. The method of switching communication modes of a communication device as recited in claim 1, wherein, when said built-in communication activation option is selected, said user operating module generates a built-in communication activation signal corresponding to said built-in communication activation option and activates said built-in communication module based on said built-in communication activation signal.

5. The method of switching communication modes of a communication device as recited in claim 1, wherein said communication device further comprises a timer being set with a first wait time, said control module reads said first wait time from said timer and activates said built-in communication module when said first wait time has elapsed and said connecting port hasn't been connected to said external communication module.

6. The method of switching communication modes of a communication device as recited in claim 5, wherein said timer is set with a second wait time, said control module reads said second wait time from said timer and activates said built-in communication module when said second wait time has elapsed and said activation signal hasn't been received.

* * * * *

UNITED STATES PATENT AND TRADEMARK OFFICE
CERTIFICATE OF CORRECTION

PATENT NO. : 7,558,601 B2  Page 1 of 1
APPLICATION NO. : 11/167084
DATED : July 7, 2009
INVENTOR(S) : Cheng-Shing Lai et al.

It is certified that error appears in the above-identified patent and that said Letters Patent is hereby corrected as shown below:

On the title page, item [73]:
        Please change assignee name from "Inventec Appliance Corp." to
-- Inventec Appliances Corp. --.

Signed and Sealed this

Fourth Day of May, 2010

David J. Kappos
*Director of the United States Patent and Trademark Office*